April 24, 1962 H. WEIBEL 3,031,237
PIPE CUTTER AND THRUST BEARING THEREFOR
Original Filed June 13, 1957
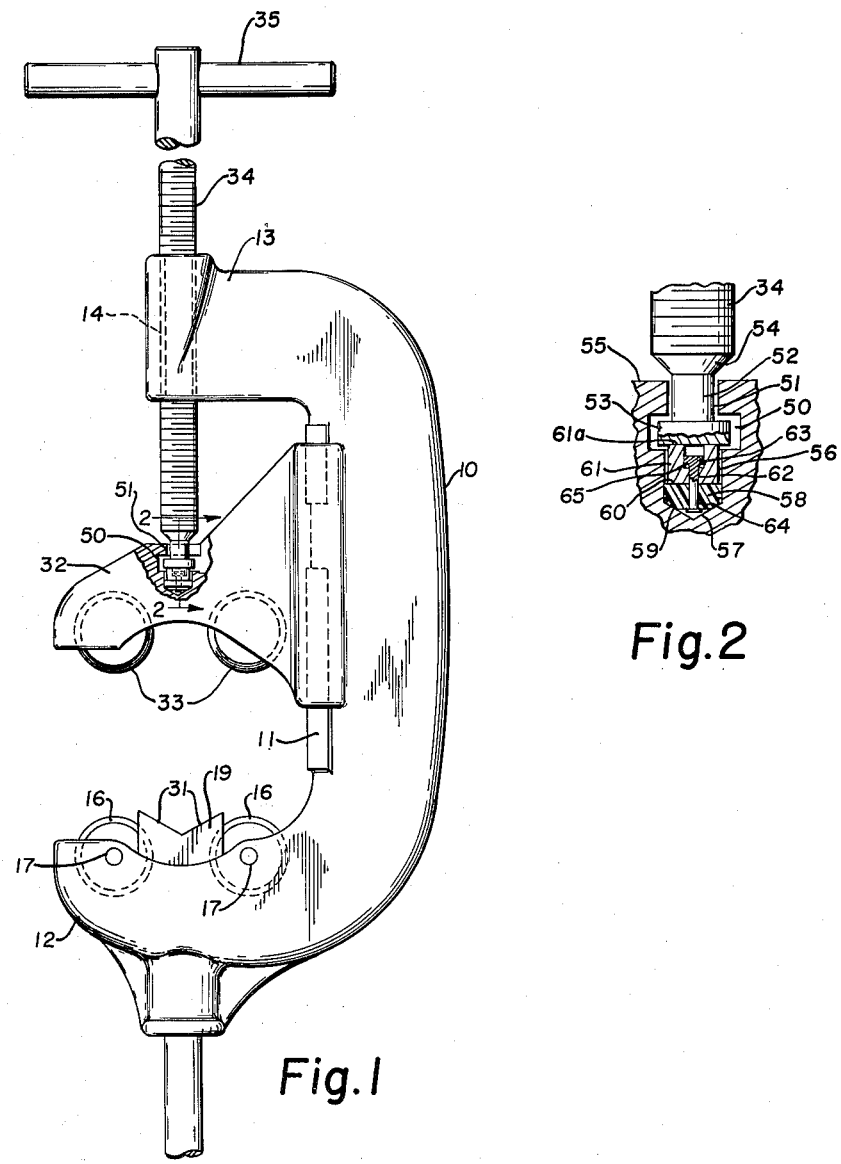
INVENTOR.
HERMAN WEIBEL

United States Patent Office 3,031,237
Patented Apr. 24, 1962

3,031,237
PIPE CUTTER AND THRUST BEARING THEREFOR
Herman Weibel, Westlake, Ohio, assignor to The Ridge Tool Company, Elyria, Ohio
Continuation of application Ser. No. 665,453, June 13, 1957. This application Apr. 16, 1958, Ser. No. 728,980
17 Claims. (Cl. 308—163)

This invention relates to a thrust bearing and to a pipe cutter having such a thrust bearing incorporated therein.

In United States Letters Patent No. 2,325,353 there is disclosed and claimed a pipe cutter comprising a frame having provision for supporting a pipe to be cut, a slide slidably mounted on the frame and carrying cutters for engagement with the pipe to be cut, and a screw-threaded rod threadedly mounted on the frame and coupled to the slide for adjusting the position of the slide in response to turning of the rod. While this pipe cutter is very well suited for its intended purpose, it has been found that its operation can be facilitated greatly by the provision of the present novel resilient thrust bearing between the rod and the slide. This thrust bearing materially reduces the frictional drag on the rod when the rod is turned to advance the slide to position its cutters in engagement with the pipe. Further, the thrust bearing provides a limited resilience or springiness in the coupling between the rod and the slide, thereby minimizing shock when the parts are operated and improving the cutting operation of the tool.

It is an object of the present invention to provide a novel thrust bearing.

It is also an object of this invention to provide a novel operating mechanism which includes the present novel thrust bearing acting between a rotatable actuating member and a slide.

Another object of this invention is to provide a novel and improved pipe cutter which has the present novel thrust bearing arranged therein so as to improve the operation of the tool.

Other and further objects and advantages of the present invention will be apparent from the following description of a presently preferred embodiment thereof, which is illustrated in the accompanying drawing.

In the drawing:

FIGURE 1 is a side elevational view, partly broken away for clarity, showing a pipe cutter incorporating the present invention; and FIGURE 2 is an enlarged section taken along the line 2—2 in FIG. 1 and showing the present thrust bearing acting between the actuating rod and the cutter carrying slide in the FIG. 1 tool.

Referring to FIG. 1, the pipe cutter which incorporates the present invention is basically similar to that shown in the previously mentioned Patent 2,324,353. It includes a frame 10 having side flanges 11 and provided at its opposite ends with transversely extending standards 12 and 13.

The standard 12 defines a pocket at which are located a pair of spaced cutting wheels 16, which are rotatably journalled on pins 17 extending across the pocket between the opposite side walls of this standard. The cutting wheels are positioned with a substantial portion of their respective peripheries (at their upper ends in FIG. 1) projecting beyond the walls of the standard 12 for engagement with one side of the pipe to be cut.

A guide block 19 is slidably mounted in the pocket in standard 12 for limited movement into and out of that pocket. The guide block is resiliently biased upward in FIG. 1 by an arrangement (not shown) which is identical to that disclosed in Patent 2,325,353, previously referred to. By virtue of this bias arrangement the upper end of block 19 projects slightly above the upper ends of the cutting wheels 16. At its upper end the block 19 presents oppositely inclined, intersecting surfaces 31 which define a V-shaped seat for receiving one side of the pipe to be cut. The guide block 19 is cut away on its opposite sides to provide clearance for the cutting wheels 16, enabling the cutting wheels to turn and also enabling the guide block to move in and out with respect to the standard 12.

The oppositely disposed standard 13 on the frame is formed with a longitudinal threaded bore 14 which threadedly receives an elongated screw-threaded rod 34 carrying a transverse handle 35 at its outer end.

A cross head or slide 32 is slidably mounted on the flanges 11 on the frame for movement toward or away from the cutting wheels 16 and the guide block 19. The slide 32 carries a pair of spaced cutting wheels 33 for engagement with the opposite side of the pipe which are aligned with the respective cutting wheels 16. The cutting wheels 33 may be mounted directly on the slide, as shown in Patent 2,325,353, or they may be pivotally supported on the slide.

The slide 32 is formed with a recess 50 having a restricted opening 51 at its upper end. An unthreaded, reduced diameter neck 52 on the rod 34 extends freely down through the opening 51 and carries an enlarged head 53 disposed loosely in the recess 50.

The rod 34 presents a frusto-conical segment 54 between the lower end of its screw-threaded portion and the upper end of its neck 52. As shown in the drawing, this frusto-conical segment 54 of rod 34 is spaced slightly above the flat top wall 55 of the slide.

Thus far, the tool holder is essentially similar to that shown in Patent 2,325,353, with the exception that the cutters 33 may be pivotally supported on the slide.

Referring now to FIG. 2, the recess 50 has a reduced diameter cylindrical pocket 56 at its inner end which terminates in a conical end wall 57. In accordance with the present invention there is provided a novel thrust bearing seated in this pocket.

This bearing includes a member 58 made of a suitable resilient, anti-friction material, of which nylon and the acetate plastic sold under the trade name "Pelrin" by E. I. du Pont de Nemours and Co., Inc., Wilmington, Delaware, are examples. Other materials having equivalent resilient and self-lubricating properties may be used. The member 58 has a cylindrical peripheral side wall which is substantially complementary to the pocket 56, so that the member 58 is snugly received in that pocket. At one end the member 58 terminates in a frusto-conical end wall 59 which seats on the conical end wall 57 of the pocket 56 in the slide. At its opposite end the resilient member 58 presents a flat end wall 60.

The thrust bearing also includes a cylindrical steel bushing 61 disposed directly above the member 58. This steel bushing is substantially smaller in cross-section than the pocket 56 and therefore is free to turn in the pocket. The bushing is formed with an axial bore 62 and a counterbore 63 at the outer end of the bore.

A steel pin 64 is rigidly connected to the member 58 and extends axially through this member. The upper end of this pin is loosely received in the bore 62 in the bushing 61. At its upper end the pin 64 carries an enlarged head 65 disposed slightly above at the inner, bottom end of the counterbore 63 in the bushing. With this arrangement, the bushing 61 is freely rotatable with respect to the resilient member 58 and the pin 64. Also, the resilient member 58 is capable of slight axial displacement with respect to the bushing 61. As shown in FIG. 2, the upper end of the head 65 on the pin is disposed substantially inward from the outer end of the counterbore 63 in which it is received.

The lower end of the head 53 on the lower end of the rod 34 bears against the flat annular outer end face 61a of the steel bushing 61.

In the use of the pipe cutter, when the rod 34 is turned to advance the slide 32 inward along the frame, the head 53 on the lower end of this rod exerts an end thrust against the outer end of the steel bushing 61. This end thrust is transmitted to the member 58 which, because of its inherent resilience or springiness, substantially absorbs any shock due to such end thrust. In addition, the steel bushing 61 is free to turn on the member 58. The self-lubricating properties of the member 58 insure that the frictional drag opposing the turning of rod 34 is minimized because of the ability of the steel bushing 61 to slide freely across the member 58. In addition, the member 58 imparts a springiness to the force exerted on the cutter-carrying slide so that the cutters 33 continue to bite deeper into the pipe following the first revolution of the tool about the pipe.

While a specific presently preferred embodiment of this invention has been described in detail herein and illustrated in the accompanying drawing, it is to be understood that various modifications, omissions and refinements which depart from the disclosed embodiment may be adopted without departing from the spirit and scope of this invention.

This application is a continuation of my earlier field pending application Serial No. 665,453, filed June 13, 1957, now abandoned.

I claim:

1. In a pipe cutter having a frame which carries means for supporting the pipe to be cut, a cutter holder adjustably mounted on said frame, and an actuating member coupled to the cutter holder and threadedly mounted in the frame to adjust the position of the cutter holder on the frame, the improvement which comprises a thrust bearing acting between said actuating member and the cutter holder, a portion of said bearing being of resilient anti-friction material, said cutter holder being formed with a recess for receiving and holding the thrust bearing, said recess being formed with a clearance space for displacement of the resilient anti-friction material.

2. In a pipe cutter having a frame, means on the frame for engagement with one side of the pipe to be cut, a cutter holder mounted on the frame for adjustment toward and away from the opposite side of the pipe to be cut, cutting means on said holder for engagement with said opposite side of the pipe to be cut, and a screw threaded rod threadedly mounted on said frame for adjustably positioning said cutter holder thereon, said cutter holder having a recess therein and said rod having its inner end received in said recess, the improvement which comprises a thrust bearing in said recess engaged between the inner end of said rod and said cutter holder, said bearing comprising a rigid member engaging the inner end of said rod and a member of resilient anti-friction material engaging said cutter holder and having a rotatable connection to said rigid member.

3. The device of claim 2, wherein said rigid member is a metal bushing having an axial bore therein, and wherein there is provided a pin rigidly connected to said resilient anti-friction member and rotatably received in said bore in the metal bushing.

4. The device of claim 3, wherein said resilient anti-friction member is snugly received in said recess and said metal bushing is loosely received in said recess and is freely rotatable with respect to said cutter holder and with respect to said resilient anti-friction member.

5. In a pipe cutter having a frame, a first pair of cutting wheels journalled on said frame for engagement with one side of the pipe to be cut, a slide slidably mounted on said frame for adjustment toward and away from said first pair of cutting wheels, a second pair of cutting wheels carried by said slide for engagement with the opposite side of the pipe, said slide having a recess which opens away from said first pair of cutting wheels, and a screw threaded rod threadedly mounted on said frame and having one end received in said recess in the slide, the improvement which comprises a thrust bearing in said recess which is engaged between said end of the rod and the slide, said bearing comprising a rigid bushing having one end engaging said rod, a member of resilient anti-friction material at the opposite end of the bushing engaging said slide, and means connecting said bushing and said resilient anti-friction member rotatably together.

6. The device of claim 5, wherein the slide presents a conical wall at the inner end of said recess and said resilient anti-friction member has a frusto-conical end face engaging said wall.

7. The device of claim 5, wherein said bushing has an axial bore therethrough and a counterbore at the outer end of said bore, and wherein said connecting means is a pin rigidly connected to said resilient anti-friction member and extending rotatably through said bore and terminating in an enlarged head in said counterbore.

8. The device of claim 5, wherein said resilient anti-friction member is snugly received in said recess and said bushing is loosely received in said recess and is freely rotatable with respect to said slide and with respect to said resilient anti-friction member.

9. In combination, a support, a slide slidably mounted on said support and having a recess formed therein, an actuator threadedly mounted on said support, and a thrust bearing disposed in said recess and engaged between said actuator and said slide, said thrust bearing including a portion of resilient anti-friction material, said recess being formed with a space to receive displaced portions of the resilient anti-friction material.

10. In combination, a support, a slide slidably mounted on said support and having an open-ended recess, a thrust bearing mounted in said recess, a screw-threaded rod threadedly mounted on said support and having an end engaging said thrust bearing for moving the slide along said support in response to turning of said rod, said thrust bearing comprising a portion of resilient anti-friction material, said recess having a portion arranged for reception of displaced resilient anti-friction material.

11. The combination of claim 10, wherein said portion of the thrust bearing is a member of resilient anti-friction material snugly received in said recess, and wherein said bearing includes a rigid bushing loosely received in said recess and rotatably connected to said resilient anti-friction member and engaging said end of the rod.

12. A thrust bearing comprising a rigid bushing having an axial bore therein and a counterbore at one end of said bore, a member of resilient anti-friction material at the end of the bushing remote from the counterbore therein, and a pin connected to said member and extending rotatably through said bore, said pin having an enlarged head in said counterbore.

13. A thrust bearing comprising a rigid bushing having an axial bore therein and a counterbore at one end of said bore which is open at one end of the bushing, a member of resilient anti-friction material at the opposite end of the bushing, and a pin rigidly connected to said member and rotatably received in said bore in the bushing, said pin terminating in an enlarged head which is seated in said counterbore and which terminates short of the open end of the counterbore at said one end of the bushing.

14. A thrust bearing comprising a metal bushing having an axial bore therein and a counterbore at one end of said bore, a member of resilient anti-friction material at the end of said bushing remote from the counterbore therein, and a pin connected rigidly to said member and extending rotatably through said bore and having an enlarged head in said counterbore in the bushing, said pin connecting the bushing rotatably to said member, said head on the pin terminating short of the outer end of said counterbore to provide a recess at the end of the counterbore, said member at its end remote from the bushing terminating in a frusto-conical face.

15. A thrust bearing comprising a metal bushing having an axial bore therein and a counterbore at one end of said bore, a nylon member at the end of said bushing remote from the counterbore therein, and a pin connected to the nylon member and extending rotatably through said bore, said pin having an enlarged head in said counterbore.

16. A thrust bearing comprising a rigid metal bushing having an axial bore therein and a counterbore at one end of said bore which is open at one end of the bushing, a nylon member at the opposite end of the bushing, and a pin rigidly connected to the nylon member and rotatably received in said bore in the bushing, said pin terminating in an enlarged head which is seated in said counterbore and which terminates short of the open end of the counterbore at said one end of the bushing.

17. A thrust bearing comprising a steel bushing having an axial bore therein and a counterbore at one end of said bore, a nylon member at the end of said bushing remote from the counterbore therein, and a pin connected rigidly to said nylon member and extending rotatably through said bore and having an enlarged head in said counterbore in the bushing, said pin connecting the bushing rotatably to the nylon member, said head on the pin terminating short of the outer end of said counterbore to provide a recess at said end of the counterbore, said nylon member at its end remote from the bushing terminating in a frusto-conical face.

References Cited in the file of this patent

UNITED STATES PATENTS

| | | |
|---|---|---|
| 1,833,980 | Thewes | Dec. 1, 1931 |
| 2,272,128 | Osbourne | Feb. 3, 1942 |
| 2,325,353 | Wright | July 27, 1943 |
| 2,565,693 | Lewis | Aug. 28, 1951 |
| 2,600,353 | Wightman | June 10, 1952 |
| 2,615,069 | Gallagher | Oct. 21, 1952 |
| 2,675,283 | Thomson | Apr. 13, 1954 |
| 2,747,275 | Jonasson | May 29, 1956 |

OTHER REFERENCES

Designing Fabricated Nylon Parts by R. B. Zimmerli; Machine Design; March 1954, pages 153–159 relied upon.